UNITED STATES PATENT OFFICE.

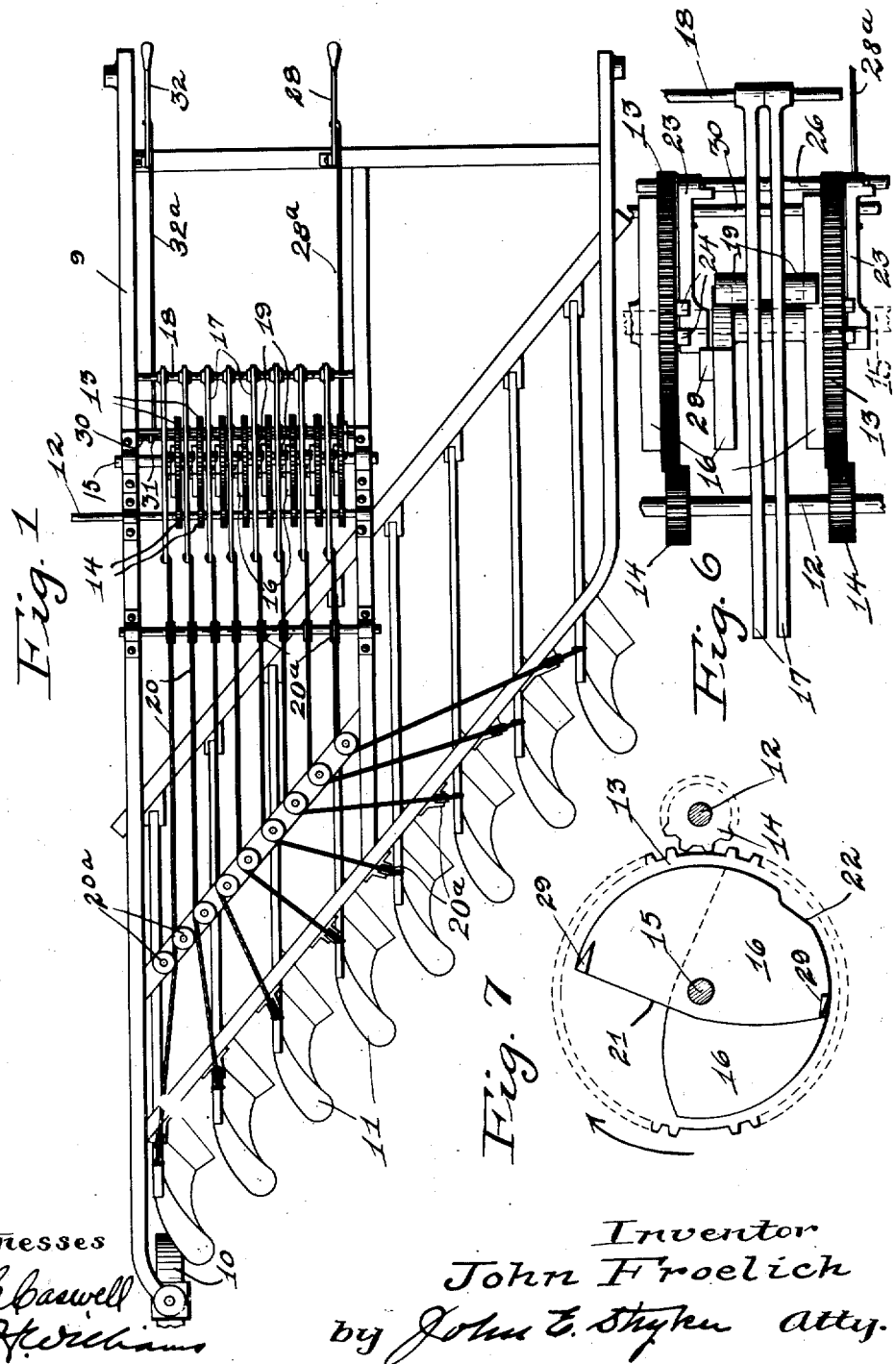

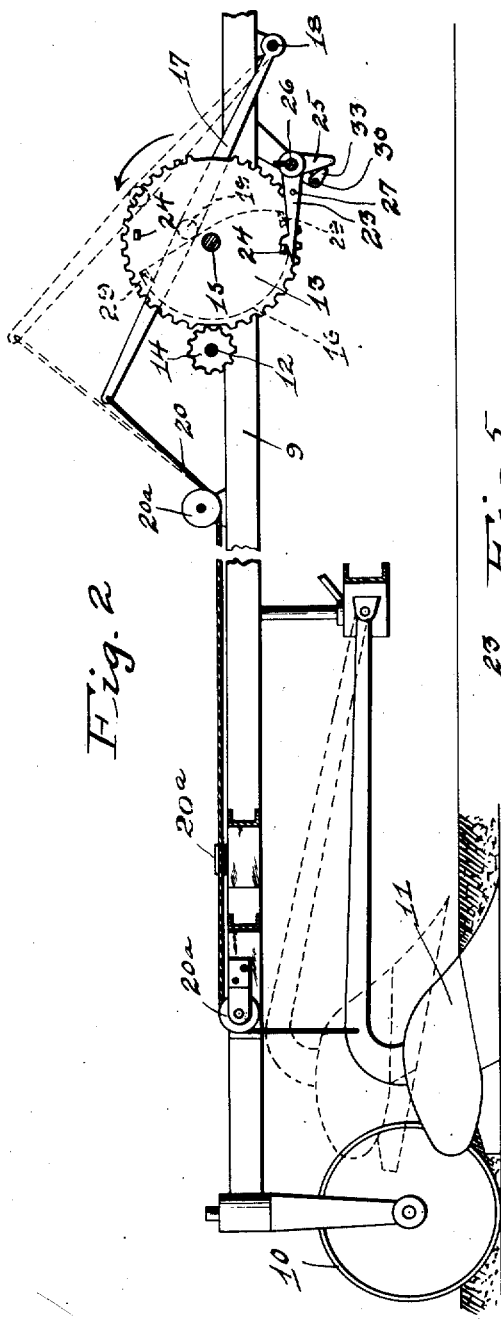

JOHN FROELICH, OF ST. PAUL, MINNESOTA, ASSIGNOR TO HACKNEY MANUFACTURING COMPANY, OF ST. PAUL, MINNESOTA, A CORPORATION OF MINNESOTA.

PLOW-LIFT FOR GANG-PLOWS.

1,056,531.      Specification of Letters Patent.      Patented Mar. 18, 1913.

Application filed November 27, 1911. Serial No. 662,754.

*To all whom it may concern:*

Be it known that I, JOHN FROELICH, a citizen of the United States, residing at St. Paul, in the county of Ramsey and State of Minnesota, have invented new and useful Improvements in Plow-Lifts for Gang-Plows, of which the following is a specification.

My invention relates to improvements in plow lifts for gang plows. Its object is to provide a simple, durable and compact power mechanism whereby a gang of plows may be raised and lowered.

A further object is to provide mechanism adapted to lower and raise the plows in succession so that when a gang of plows starts from or reaches the side of a field, the ends of the furrows will form a straight line.

A further object is to provide a plow lift adapted to raise and lower a series of plows successively or collectively as desired.

In the drawings, Figure 1 is a plan view of my plow lift, shown in connection with a gang of plows; Fig. 2 is a detail side elevation of the same showing a section of the plow lift in different positions, and in connection with a plow body; Fig. 3 is a plan view in detail showing part of the plow lift; Fig. 4 is a sectional view taken on the line 4—4 of Fig. 3; Fig. 5 is a detail side view of a stop for one of the plow lift sections; Fig. 6 is a plan view in detail showing an alternate construction of my plow lift and Fig. 7 is a detail elevation showing the cam construction on one of the plow lift sections as alternately constructed.

Referring to the accompanying drawings, my gang plow may comprise a frame 9, adapted to be connected at its forward end to a tractor or other vehicle and provided with a rear supporting wheel 10 and a series of plows 11 pivotally connected at their forward ends to said frame.

The plow lift is arranged on the frame 9 and is constructed as follows: The drive shaft 12 is rotated by a motor, supporting wheel or other convenient source of power (not shown) and is provided with drive gears 14 arranged to mesh with the spaced driven gears 13 journaled on the shaft 15. The gears 13 are mutilated, *i. e.* several teeth on arcs, diametrically opposite to each other, are absent, so that each of said gears may rest in two different normal positions out of mesh with said drive gears 14. Each gear 13 is provided with a cam 16 adapted to coact with an arm 17 pivotally mounted at one end on the shaft 18. The arms 17 are provided with rollers 19, arranged to bear against the faces of said cams, and to support the arms 17, which are connected at their free ends by cables 20 to the plow bodies 11. These cables between the arms 17 and the plow bodies pass over properly distributed pulleys or blocks 20ª. In one normal position of the gears 13, the rollers 19 rest on the faces of the cams 16 at 21 and hold the arms in a lowered position, thus permitting the fall of the plows to their proper working depth. In the other normal position the rollers 19 rest on the faces of the cams 16 at 22 and hold the arms 17 and plows 11 in an elevated position. The faces of the cams 16 are inclined from the points 21 and 22 and when the rollers 19 bear against said cams at either of these points, there is a tendency to rotate the gears 13 forward, as indicated by arrows in Figs. 4 and 7 of the drawings. Stops 23 are provided to engage the lugs 24 on the gears 13, to prevent this tendency to rotate and secure said gears in their normal positions in disengagement from the drive gears 14. These stops are provided with arms 25 and are journaled on the shaft 26 which is supplied with springs 27 adapted to yieldingly hold said stops in position to engage the lugs 24. The arm 25 on the stop 23, which locks the gear 13 to hold the leading plow, is connected to the hand lever 28 by a rod 28ª and is operated thereby to disengage said stop from the lugs 24 and release said gear wheel 13. When this gear is released the pressure brought to bear by the roller 19 on the inclined surfaces of its cam at either of the points 21 or 22 turns said gear to a position in which it meshes with its proper drive gear 14, whereby it is turned a half revolution to its second normal position, where it is again locked by its stop 23. Each of the cams 16 is provided with two inclined trip lugs 29. These lugs are arranged to strike and release the stops 23 from the lugs 24 and are located on each cam in such relative positions, that when a cam is revolved, one of its trip lugs 29 releases (at the completion of its half revolution) the stop for the adjacent gear 13. Thus after the first stop 23 has been released by the hand lever 28, the remaining stops are released successively and the gears 13 are accordingly turned a half revolution to raise or lower the plows one after the other. The rotation of the drive shaft 12 is regulated and the gears timed so that when the plows are thus lowered or raised in series, the furrows will begin or end on a straight line at right angles to said furrows. I have also adapted this mechanism to raise and lower the entire gang of plows as a unit. The rocker-shaft 30, on the frame 10, is provided with an arm 31 connected with the hand lever 32 by a rod 32ᵃ and with cams 33 respectively in position adjacent to the arms 25 on the stops 23. The movement of these cams, by the manipulation of the lever 32 releases all of said stops at once and causes the simultaneous rotation of the gears 13 from one normal position to the other, thus raising or lowering the plows concurrently.

In my alternate construction, illustrated in Figs. 6 and 7, I supply each of the gears 13 with a plurality of cams 16 instead of one as above described. These cams are each supplied with an arm 17, only one cam in each set however is provided with the trip lugs 19. The operation of this form is identical with that of the preferred form above described, with the exception that two plows instead of one are raised or lowered upon the half revolution of each gear 13.

What I claim as new and desire to protect by Letters Patent is:

1. The combination with a suitably supported platform and a series of plows connected thereto, of a plow lift, comprising a fixed shaft on said platform, a plurality of cams loosely mounted on said shaft, power driven means for intermittently rotating said cams, and arms connected with said plows and operated by said cams.

2. The combination with a suitably supported platform of a series of plows connected thereto, a plow lift comprising a plurality of revoluble power driven cams, arms in connection with said plows and operated by said cams, stops for locking the cams, and means for successively releasing said cams whereby the plows are raised and lowered one at a time.

3. The combination with a suitably supported platform of a series of plows connected thereto, a plow lift comprising a plurality of power driven cams, arms in connection with said plows and operated by said cams, stops for locking the cams and means for simultaneously releasing said cams.

4. The combination with a suitably supported platform of a series of plows connected thereto, a plow lift comprising a continuously driven shaft, a series of drive gears on said shaft, a series of driven gears adapted to mesh with said drive gears, cams on said driven gears, arms connected with said plows and operated by said cams, stops for locking each of said driven gears, means for manually releasing the first driven gear of the series, and means on each cam for releasing its adjacent driven gear.

5. A plow lift comprising a series of drive gears, a series of mutilated driven gears arranged to mesh with said drive gears and adapted to revolve intermittently, substantially a half revolution at a time, cams on said driven gears, stops for locking said gears, means for releasing said gears and means for throwing said drive and driven gears into mesh.

6. A plow lift comprising a series of drive gears, a series of driven gears with teeth omitted on arcs diametrically opposite each other, cams on said driven gears, stops for locking and means for releasing said gears, and pivoted arms supported and oscillated by said cams, adapted to impart an initial movement to said driven gears for intermeshing the same with said drive gears.

7. A plow lift comprising a series of drive gears, a series of driven gears adapted to mesh with said drive gears and having teeth omitted on arcs diametrically opposite each other, lugs on said driven gears, stops for engaging said lugs to lock said gears in positions out of mesh with said drive gears, means for manually releasing one of said driven gears, cams on said driven gears, pivoted arms supported and oscillated by said cams adapted to impart an initial movement to the driven gears when released, and means for releasing the adjacent driven gear as the preceding gear completes a half revolution.

8. A plow lift comprising a series of drive gears, a series of driven gears adapted to mesh with said drive gears and having teeth omitted on arcs diametrically opposite each other, lugs on said gears, stops for engaging said lugs to lock said gears in positions out of mesh with said drive gears, means for simultaneously releasing said driven gears, cams on said driven gears and pivoted arms supported and oscillated by said cams, adapted to impart an initial movement to the driven gears when released.

9. A plow lift comprising a series of drive gears, a series of driven gears adapted to mesh with said drive gears and having teeth omitted on arcs diametrically opposite each other, lugs on said gears, stops for engaging said lugs to lock said gears in positions out of mesh with said drive gears, a series of cams adapted to engage said stops, a hand lever for simultaneously operating said cams to disengage said lugs and stops, cams on said driven gears and pivoted arms supported and oscillated by said last mentioned cams, adapted to impart an initial movement to said drive gears whereby said drive and driven gears are intermeshed.

10. In a plow lift of the class described, the combination of a suitably supported frame, a series of plows connected thereto, means for successively lifting and lowering the plows, and means for inhibiting said successive action and raising or lowering all of said plows simultaneously.

11. The combination with a suitably supported platform of the series of plows connected thereto, a plow lift comprising a plurality of revoluble power driven cams, arms connected with said plows and severally operated by the respective cams, a stop for each cam and means for successively or simultaneously releasing said cams to raise and lower said plows singly or collectively.

12. A lift for gang plows, comprising arms connected with the plows respectively, a cam shaft and a series of cams revoluble thereon and continuously contacting with said arms each of said cams having a continuous surface comprising an active lifting portion, a plow sustaining high portion, a plow dropping portion, and a low portion between the lifting and plow dropping portions and means for operating the cams simultaneously or successively.

13. A lift for gang plows comprising arms connected with the plows respectively, a cam shaft and a series of cams revoluble thereon and continuously contacting with said arms, a stop for each cam, a shaft parallel with said cam shaft and means on said second shaft for simultaneously disconnecting said stops from said cams.

14. A lift for gang plows comprising arms connected with the different individual plows, a cam shaft and a series of cams revoluble thereon and continuously contacting with said arms, a shaft carrying stops to lock said cams and a shaft carrying lugs to simultaneously shift said stops and release said cams, said last mentioned shafts being substantially parallel with said cam shaft.

In testimony whereof, I have signed my name to this specification in the presence of two subscribing witnesses.

JOHN FROELICH.

Witnesses:
F. C. CASWELL,
W. H. WILLIAMS.

---

Correction in Letters Patent No. 1,056,531.

It is hereby certified that in Letters Patent No. 1,056,531, granted March 18, 1913, upon the application of John Froelich, of St. Paul, Minnesota, for an improvement in "Plow-Lifts for Gang-Plows," an error appears in the printed specification requiring correction as follows: Page 2, line 29, for the reference-numeral "19" read 29; and that the said Letters Patent should be read with this correction therein that the same may conform to the record of the case in the Patent Office.

Signed and sealed this 22nd day of April, A. D., 1913.

[SEAL.]
C. C. BILLINGS,
*Acting Commissioner of Patents.* to said drive gears whereby said drive and driven gears are intermeshed.

10. In a plow lift of the class described, the combination of a suitably supported frame, a series of plows connected thereto, means for successively lifting and lowering the plows, and means for inhibiting said successive action and raising or lowering all of said plows simultaneously.

11. The combination with a suitably supported platform of the series of plows connected thereto, a plow lift comprising a plurality of revoluble power driven cams, arms connected with said plows and severally operated by the respective cams, a stop for each cam and means for successively or simultaneously releasing said cams to raise and lower said plows singly or collectively.

12. A lift for gang plows, comprising arms connected with the plows respectively, a cam shaft and a series of cams revoluble thereon and continuously contacting with said arms each of said cams having a continuous surface comprising an active lifting portion, a plow sustaining high portion, a plow dropping portion, and a low portion between the lifting and plow dropping portions and means for operating the cams simultaneously or successively.

13. A lift for gang plows comprising arms connected with the plows respectively, a cam shaft and a series of cams revoluble thereon and continuously contacting with said arms, a stop for each cam, a shaft parallel with said cam shaft and means on said second shaft for simultaneously disconnecting said stops from said cams.

14. A lift for gang plows comprising arms connected with the different individual plows, a cam shaft and a series of cams revoluble thereon and continuously contacting with said arms, a shaft carrying stops to lock said cams and a shaft carrying lugs to simultaneously shift said stops and release said cams, said last mentioned shafts being substantially parallel with said cam shaft.

In testimony whereof, I have signed my name to this specification in the presence of two subscribing witnesses.

JOHN FROELICH.

Witnesses:
F. C. CASWELL,
W. H. WILLIAMS.

---

Correction in Letters Patent No. 1,056,531.

It is hereby certified that in Letters Patent No. 1,056,531, granted March 18, 1913, upon the application of John Froelich, of St. Paul, Minnesota, for an improvement in "Plow-Lifts for Gang-Plows," an error appears in the printed specification requiring correction as follows: Page 2, line 29, for the reference-numeral "19" read 29; and that the said Letters Patent should be read with this correction therein that the same may conform to the record of the case in the Patent Office.

Signed and sealed this 22nd day of April, A. D., 1913.

[SEAL.]
C. C. BILLINGS,
*Acting Commissioner of Patents.*

It is hereby certified that in Letters Patent No. 1,056,531, granted March 18, 1913, upon the application of John Froelich, of St. Paul, Minnesota, for an improvement in "Plow-Lifts for Gang-Plows," an error appears in the printed specification requiring correction as follows: Page 2, line 29, for the reference-numeral "19" read *29;* and that the said Letters Patent should be read with this correction therein that the same may conform to the record of the case in the Patent Office.

Signed and sealed this 22nd day of April, A. D., 1913.

[SEAL.]

C. C. BILLINGS,

*Acting Commissioner of Patents.*